T. & J. MILLOT.

Flower-Makers' Grass-Cutting Machine.

No. 6,297. Reissued Feb. 16, 1875.

Witnesses
Chas H Smith
Geo. T. Pinckney

Inventors.
Theophilus Millot.
James Millot.
for L. W. Serrell
Atty.

THE GRAPHIC CO. PHOTO-LITH. 39 & 41 PARK PLACE, N.Y.

UNITED STATES PATENT OFFICE.

THEOPHILUS MILLOT AND JAMES MILLOT, OF NEW YORK, N. Y.

IMPROVEMENT IN FLOWER-MAKERS' GRASS-CUTTING MACHINES.

Specification forming part of Letters Patent No. 144,916, dated November 25, 1873; reissue No. 6,297, dated February 16, 1875; application filed January 26, 1875.

*To all whom it may concern:*

Be it known that we, THEOPHILUS MILLOT and JAMES MILLOT, of the city and State of New York, have invented a new and Improved Machine for Cutting Flower-Makers' Grasses, of which the following is a specification:

Our invention consists of a cutting-board and a shifting guide for it, combined with a cutting-machine, such as is commonly used for cutting paper, but having a peculiar cutter, whereby the pack of cloth or other material to be slitted and cut off in bunches is clamped upon said board, and moved along beneath the cutting-blade in the ordinary way of feeding up the material; but instead of the material being entirely separated it is slit without injuring the sheet at the end of the cut, so that several strips or spears remain connected, and then the pack is shifted laterally, or in the lengthwise direction of the blade, for cutting off bunches of the grass-blades. Our invention also consists of a point-trimming blade, arranged on a movable support, so that it can be actuated before each operation of the slitting and cutting-off blade, to bevel the corners of the sheets of material while the pack is in the position for the cutting-off and slitting blade to act. The support for this trimming-blade is so arranged that when the slitting-blade moves down, an inclined plane on it will move the point-cutter out of the way of the slitting-blade.

Figure 1:
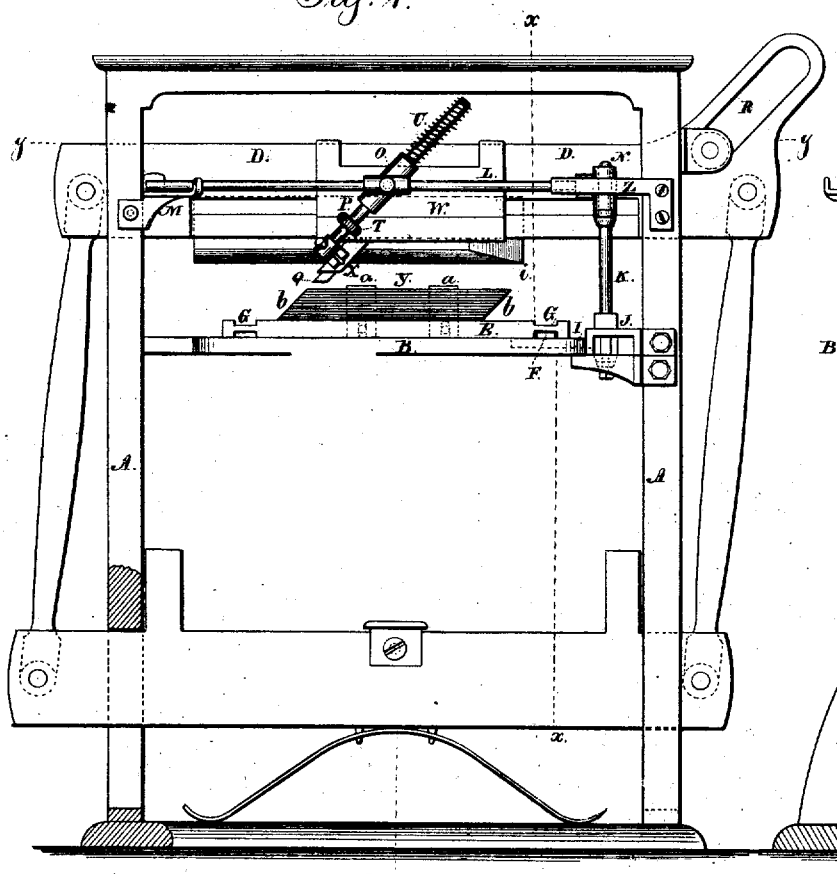
Figure 2:
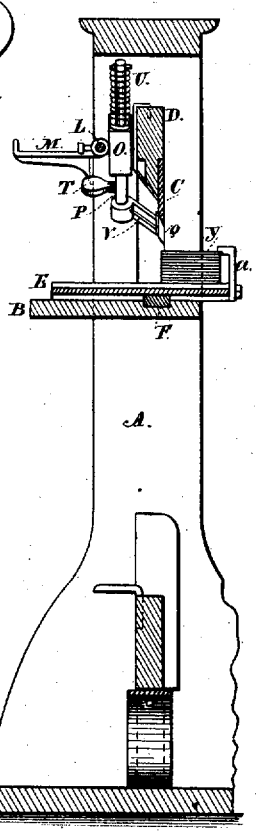
Figure 3:
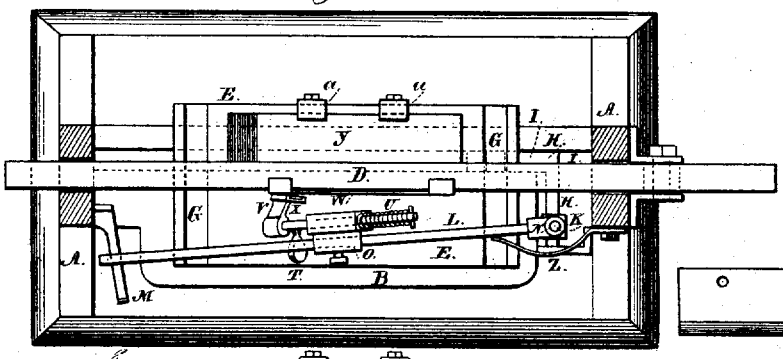
Figure 4:
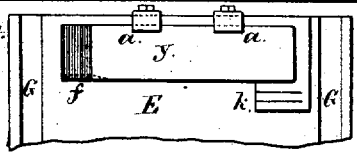
Figure 5:
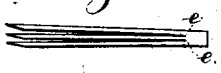
Figure 6:
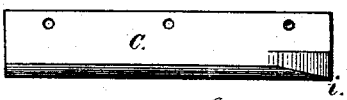

Figure 1 is a side elevation of our improved machine. Fig. 2 is a vertical section of Fig. 1, taken on the line *x x*. Fig. 3 is a sectional plan taken on the line *y y* of Fig. 1. Fig. 4 is a plan of the cutting-board with a pack of cloth pieces to be cut. Fig. 5 is a plan view of a bunch of grass as cut by the machine, and Fig. 6 is an elevation of the cutter.

Similar letters of reference indicate corresponding parts.

A represents the frame, B the table, and D the cross-bar, of an ordinary paper-cutting machine. E is a cutting-board, and F the guide for it, which we combine with the said machine for feeding the packs of material to be cut; also, for shifting them from the position for being slitted to the one for being cut off, and vice versa.

The said cutting-board consists of an ordinary piece of hard wood of suitable size, with a groove, G, extending across it on both sides near each end, to run over the guide F, which consists of a stud raised up above the surface of the table B from an angle-bar, H, laid in a groove, I, in said table, the bar resting at its outer end upon a bracket that is attached to the frame at one corner of the table, so that the bar H and cutting-board E can slide in a direction lengthwise of the cutter C, and at the same time a standard, K, that rises up from the bar is supported above the table and sustains the long horizontal rod L, which extends across to and rests upon the horizontal arm M. This rod is connected to the standard by a socket-piece, N, which turns freely on the standard and allows the rod to swing along the arm M toward and from the cutter C. This rod carries the tubular holder O of the stock P of the pointing-knife Q, said holder being arranged oblique to the rod, but parallel to the slot-guide R, with which the cutter C is provided to cause it to shear-cut. The stock P slides down and up in said holder to bevel off the corner of the pack, as shown by dotted lines at *f*, Fig. 4, to any angle at which the cutter may be placed. This pointing-knife is forced down by the hand of the attendant applied to the handle T, and up by the spring U. The arm V, by which this cutter Q is attached to its stock, inclines toward the plane of cutter C, so that the point-cutter Q extends to or a little beyond said plane when below the cutter C, to make sharp points on the grass-blades; consequently it is in the way of the cutter C. Therefore the rod L is fixed on the standard K to allow said cutter Q to be swung out of the way, and the cutter C is provided with an inclined plate, W, which strikes against the head X of cutter Q each time said cutter C goes down, and swings said cutter out of the way. A spring, Z, swings the cutter back.

As the grasses are to be of different lengths, the cutter-holder X is fixed on the rod L, so as to slide to adjust the cutter accordingly, and it is also necessary to be adjustable, because the packs Y of muslin or other material are liable to be adjusted differently on the board E. Said packs are clamped at the rear edge on the board by the clips *a*, and they are piled obliquely at the ends *b* to correspond with the shear of the blade C, so that when the slits *e*, Fig. 5, are cut each layer or sheet of material will be slitted to the same distance from the end. The cutter C is made with a sharp edge at the bottom to cut as usual, and the end *i* of said cutter C is also beveled, as seen in Figs. 1 and 6, so that the blade is sufficiently thin at the end which comes next to the head of the grass to prevent the material being torn at the end of the cut.

When the pack of sheets to be cut is clamped to the board E, it is arranged so that the end of bar H, stopping against the frame when the cutting-board is shifted to the right, will arrest the pack in such relation to the end *i* of the cutter C that it will slit the pack to the right distance from the ends of the sheets. When the cutting-board is shifted in the other direction for adjusting the pack for cutting off the bunches, it is arrested by the other end of the bar H coming against a stop formed by the corner of the table B.

In practice, the cutting-board will be fed to the cutter C by an automatic feed; but the lateral adjustment will preferably be effected by the attendant, although it may be done automatically, if desired.

The object of having the cutting-board guide F and the point-cutting-knife support connected is, that the point-cutter will shift with the board and the pack as they are moved for slitting and cutting off.

A paper strip, *k*, may be placed on the board under the package to be cut, as shown in Fig. 4, as a guide to the operator, to show by the slits *e* therein when the bunches are cut off, and when the board is to be shifted to the position for cutting off the bunch. It also shows the number of bunches cut off, from which the number of grasses may be calculated. These grasses have heretofore been cut by hand with a knife, and a rule or gage to guide the knife—a slow and tedious process—and the work was very imperfect.

A power-machine will cut through a pack many times thicker than can be cut by hand, and it will work much quicker; besides, it will do the work with great accuracy.

We claim as our invention—

1. The combination of a cutting-board, E, and a clamp for holding the pack of material to be cut on said board, with a paper-cutting machine, the said board being arranged on a feed-guide having adjustability laterally to the feed, for shifting the pack to the position for cutting the slits, and also to the position for cutting off the bunches, substantially as specified.

2. The cutter C, made with the beveled end *i* and a lower cutting-edge, in combination with the mechanism for clamping and moving the pack of sheets in cutting the slits of artificial grasses, as set forth, so that the material at the end of the slit is not injured, as specified.

3. The combination of a point-cutter, Q, with the cutter C and cutting-board, substantially as specified.

4. The said point-cutter connected with the shifting cutter-board guide H, to be shifted with the board, substantially as specified.

5. The cutter Q, arranged on a movable support, in combination with an incline on the cutter C, that moves it out of the way of said cutter C when the latter descends, substantially as specified.

6. The combination of the paper or cloth guide *k* with the cutting-board, substantially as specified.

7. The arrangement of shifting angle-bar H, standard K, swinging rod L, adjustable cutter-support O, and spring Z with the cutter C and table B, substantially as specified.

8. The point-cutter Q, arranged to work in an inclined plane coinciding with the shearing inclination of the cutter C, substantially as specified.

Signed by us this 21st day of January, A. D. 1875.

THEOPHILUS MILLOT.
JAMES MILLOT.

Witnesses:
GEO. T. PINCKNEY,
CHAS. H. SMITH.